United States Patent [19]
Ryan

[11] 3,902,334
[45] Sept. 2, 1975

[54] CONSTANT TORQUE CLUTCH

[75] Inventor: Ralph L. Ryan, Lake Parsippany, N.J.

[73] Assignee: Compensating Tension Controls, Inc., Orange, N.J.

[22] Filed: Feb. 13, 1974

[21] Appl. No.: 442,175

[52] U.S. Cl. .............. 64/30 R; 64/30 C; 192/111 B; 403/59
[51] Int. Cl. .............................................. F16d 7/02
[58] Field of Search ...... 64/30 C, 30 D, 30 E, 30 A, 64/30 R, 30 LB, 29; 192/111 B; 403/59, 60

[56] References Cited
UNITED STATES PATENTS

| | | | |
|---|---|---|---|
| 2,268,373 | 12/1941 | Cartlidge | 64/30 C |
| 2,954,224 | 9/1960 | Schneider et al. | 64/30 C |
| 3,327,819 | 6/1967 | Warwick | 64/30 R |
| 3,396,557 | 8/1966 | Moores | 64/30 R |
| 3,587,460 | 6/1971 | Chambon | 64/30 D |

*Primary Examiner*—Samuel Scott
*Assistant Examiner*—Randall Heald
*Attorney, Agent, or Firm*—Gerald Durstewitz

[57] ABSTRACT

The device comprises first and second clutch members rotatably mounted on a shaft to transmit torque therebetween. A spring washer urges the second member against the first member. A plate keyed to the shaft engages the spring washer and is moveable along the shaft to change the loading on the spring washer. A torsion spring is connected between the second clutch member and the plate to transmit torque to the shaft. The second clutch member rotates with respect to the shaft until the load on the torsion spring equals the frictional force between the clutch members. A camming arrangement between the spring washer and the second clutch member changes the loading on the washer in response to changes in the relative rotational position of the second clutch member to compensate for changes in the coefficient of friction between the clutch members. An annular nut rotatably mounted on the plate and an annular screw rotatably mounted on the shaft adjust the location of the plate to adjust the torque transmitted by the device.

7 Claims, 3 Drawing Figures

CONSTANT TORQUE CLUTCH

BACKGROUND OF THE INVENTION

The present invention relates to devices such as clutches or brakes for frictionally transmitting torque between two members, and more particularly to such devices for maintaining the torque substantially constant.

The present invention is an improvement over the device disclosed in U.S. Pat. No. 3,327,819. The prior art device comprises first and second clutch plates rotatably mounted on a shaft. The second clutch plate carries a cylindrical housing, and a torsion spring is positioned in the housing with one end attached to the second clutch plate and the other end attached to a torque adjusting plate which is locked to the shaft by a set screw. A stop arm is locked to the hub of the torque adjusting plate by a set screw for preventing the spring from unwinding (by driving the second clutch plate) when the clutch is not in use. A pin on the end of the stop arm limits the rotary motion of the arm with respect to the second clutch plate by engaging fins on the second clutch plate. Between the second clutch plate and the torque adjusting plate is a camming arrangement comprising a pair of cam surfaces carried by the second clutch plate and a pair of rollers mounted on a yoke which is locked to the shaft.

In order to change the torque setting of this prior art device, the set screws holding the torque adjusting plate and the stop arm must be loosened and the torque adjusting plate rotated to a new position and the screws re-tightened. Since the second clutch plate and the adjusting plate rotate with the shaft, the input to the clutch must be disconnected in order to adjust the torque setting.

SUMMARY OF THE INVENTION

Accordingly, it is an object of the present invention to provide a constant torque device which can be adjusted while the device is in operation.

Another object is to provide such a device which can be simply and rapidly adjusted.

Another object is to provide such a device which is simple and economical in construction and is reliable in operation.

The foregoing objects are accomplished by providing a constant torque device comprising first and second clutch members rotatably mounted on a shaft, resilient means for urging the clutch members together, a torque altering member mounted to rotate with the shaft and to be moved axially with respect thereto to change the load on the resilient means, a torsion spring connected between the second clutch member and the altering member to transmit torque to the shaft, the second clutch member rotating with respect to the shaft until the load on the spring equals the frictional force between the clutch members, friction compensating means responsive to the relative angular position of the second clutch member and the shaft for changing the loading on the resilient means to compensate for frictional changes, and adjusting means for axially moving the altering member to change the torque transmitted by the device.

BRIEF DESCRIPTION OF THE DRAWINGS

A preferred embodiment of the invention has been chosen for the purpose of illustration and description and is shown in the accompanying drawings, forming a part of the specification, wherein.

DESCRIPTION OF THE PREFERRED EMBODIMENT

Figure 1:
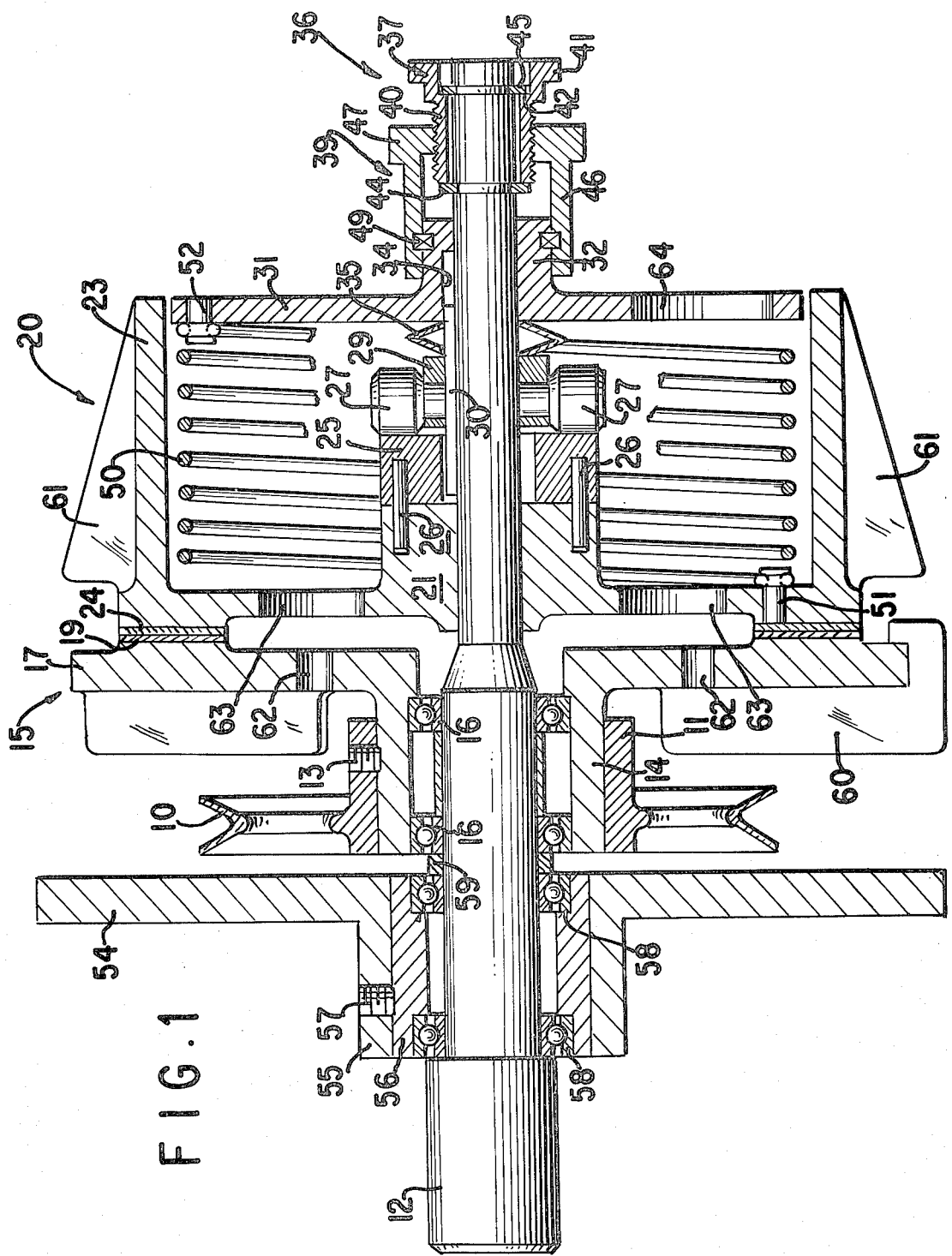
FIG. 1 is a longitudinal sectional view of a constant torque device according to the present invention.

Referring to the drawings in detail, there is shown a device according to the present invention which transmits a constant torque between a pulley 10 mounted on a hub 11 and a shaft 12. The hub 11 is mounted on an annular flange 14 of a first clutch member 15 and is locked thereto by a set screw 13. The flange 14 is journaled to the shaft 10 by means of a pair of bearings 16, and the clutch member 15 includes a circular clutch plate 17 provided with an annular friction disc 19. A second clutch member 20 is journaled to the shaft 12 by means of a hub 21 and also includes a circular clutch plate 22 and a cylindrical housing 23. An annular friction disc 24 is mounted on the plate 22 facing the disc 19. An annular cam member 25 is secured to the hub 21 by pins 26 for rotation with the second clutch member 20. A pair of rollers 27 are rotatably mounted on shafts (not shown) which are carried by an annular yoke 29 which is mounted on the shaft 12. A woodruff key 30 is fitted into the shaft 10 and the yoke 29 is provided with an axial slot to accept the key 30 so that the yoke 29 can slide axially upon the shaft but is locked against relative rotation therewith. The inner diameter of the cam member 25 is large enough to clear the key 30.

A torque altering plate 31 having a hub 32 is mounted on the shaft 12 at the end of the housing 24. The hub 32 is provided with an axial slot 34 for accepting the key 30 to allow axial movement of the plate 31 which prevents rotation relative to the shaft 12. A bellville washer 35 is positioned on the shaft 12 between the plate 31 and the yoke 29. The torque altering plate 31 is moved axially toward and away from the clutch plate 22 of the second clutch member 20 by an adjusting assembly 36 mounted on the shaft 12 comprising a screw member 37 and a nut member 39. The screw member 37 has a tubular threaded portion 40 and an annular head 41 having a knurled outer surface. The interior of the member 37 is formed with a shoulder 42. A thrust bearing 44 is locked to the shaft at the inner end of the screw member 37, and a second thrust bearing 45 is locked to the shaft at the shoulder 42. The bearings 44 and 45 permit the screw member 37 to freely rotate about the shaft 12, but lock the member 37 against axial movement. The nut member 39 includes a tubular portion 46 which extends over the hub 32 of the plate 31 and an annular head portion 47. The head 47 is threaded on its inner diameter and has a knurled outer surfaces. The tubular portion 46 of the nut member 39 is locked to the hub 32 by a bearing 49 so that the member 39 will rotate freely with respect to the plate 31 but the two are locked against relative axial movement.

A helical torsion spring 50 is positioned within the housing 23. The ends of the spring 50 are secured to the plate 22 of the second clutch member 20 and to the plate 31 by posts 51 and 52 respectively.

The device is mounted to a stand or piece of machinery by means of a mounting plate 54 having an annular flange 55. The flange 55 is secured to a bearing adaptor 56 by means of a set screw 57. The shaft 12 is journaled in the adaptor on a pair of bearings 58. A spacer 59 is positioned on the shaft between the mounting plate 54 and the hub 14.

The clutch members 15 and 20 are provided with a plurality of heat radiating fins 60 and 61 respectively and the plates 17, 22, and 31 are provided with holes 62, 63, and 64 respectively to dissipate heat generated by friction between the discs 19 and 24.

Figure 3:
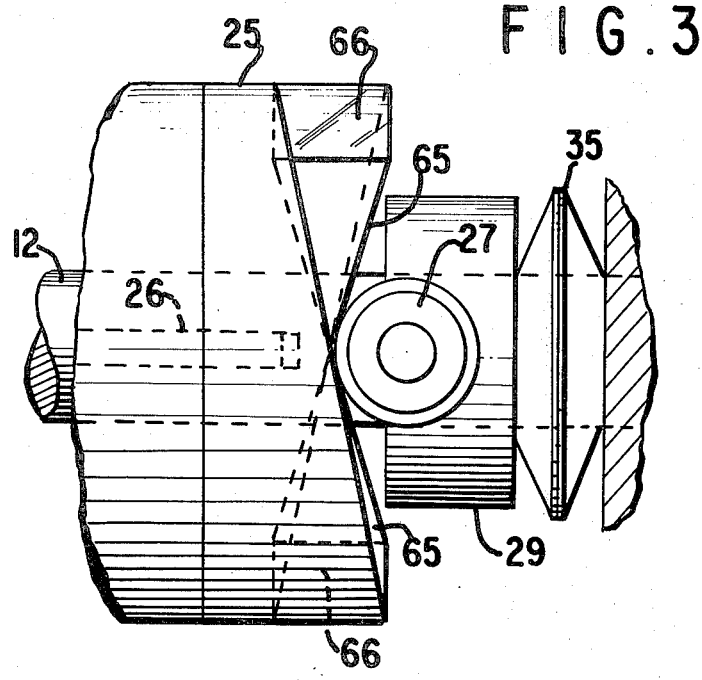
FIG. 3 is an enlarged fragmentary view of the camming arrangement taken along this line 3—3 on FIG. 1.

As shown in FIG. 3, the cam member 25 is formed with two 180 degree arcuate inclined cam surfaces 65 facing the rollers 27. At each of the two junctions of the two cam surfaces 65, a wall 66 parallel to the axis of the shaft 12 extends from the high point of each surface to the low point of the other surface.

Figure 2:
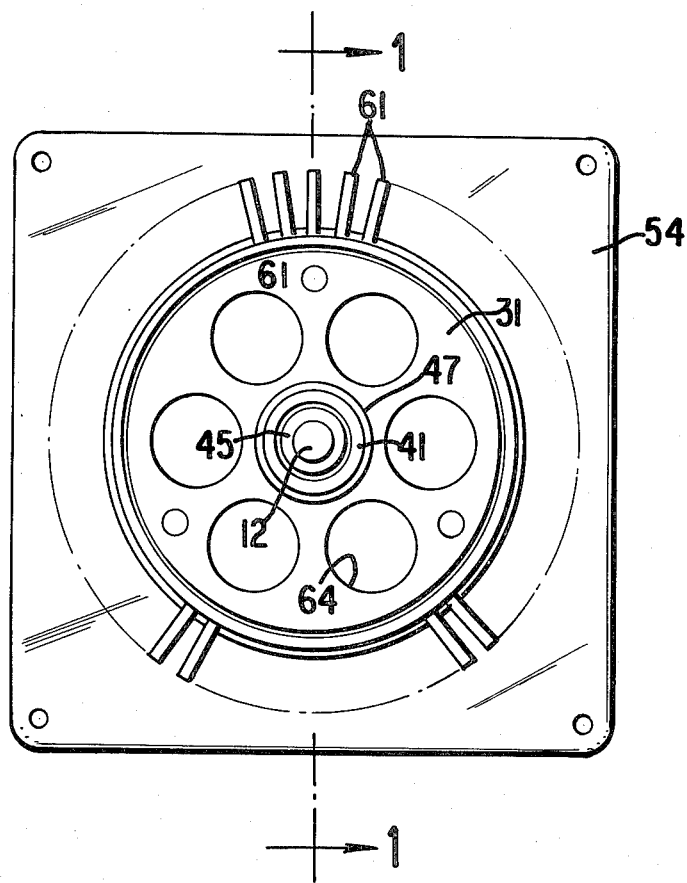
FIG. 2 is a right end view of the device shown in FIG. 1.

As shown in FIG. 2, the torque altering plate 31 carries a set of numerals (0 to 9) equally spaced about the periphery thereof. A position indexing mark 67 is inscribed on the edge of the housing 23. As the torque setting of the unit is changed, the clutch member 20 is angularly displaced with respect to the plate 31 so that the index mark moves around the outer periphery of the plate to indicate the torque setting of the device.

In operation, when the pulley 10 is not being driven the spring 50 rotates the clutch member 20 until the high points of the cam member 25 are under the rollers 27 and the spring is in an unloaded condition. The bellville spring washer 35 ueges the clutch member 20 towards the clutch member 15, forcing the friction disc 24 against the disc 19.

When power is applied to the pulley 10 to rotate the clutch member 15, the friction between the discs 19 and 24 causes the clutch member 20 to be driven in the same direction. The rotation of the clutch member 20 is transmitted through the spring 50 to the shaft 12 by means of the plate 31. The initial movement of clutch member 20 causes the spring 50 to wind up (become loaded) while the cam 25 is rotated under the rollers 27. The rollers 27, in effect, roll down the inclined cam surfaces 65 and thus move toward the plate 22 to reduce the force applied by the spring washer 35 against the clutch member 20. The force pressing the disc 24 against the disc 19 thus decreases. At the same time, the increasing load on the spring 50 resists the tendency of the clutch member 20 to rotate along with the clutch member 15. The clutch member 20 rotates with respect to the shaft 12 (and parts keyed thereto) until the increasing load on the spring 50 matches the decreasing frictional force between the discs 19 and 24. At this point equilibrium is established and a constant torque is delivered to the shaft 12. In the equilibrium condition, a controlled slippage exists between the discs 19 and 24 so that the clutch member 15 is driven at a faster rate than the member 20.

Changes in the coefficient of friction of the discs 19 and 24 (for example, due to changes in temperature, humidity, and aging or wear of the materials) are automatically compensated for by a change in the relative angular position between the clutch member 20 and the shaft 12. An increase in the coefficient of friction causes a decrease in the slippage between the discs 19 and 24, and the clutch member 20 tends to rotate faster than the shaft 12. The loading on the spring 50 thus increases to restrain the member 20 while the rollers 27 move down the cam surfaces 65 to decrease the frictional force. Equilibrium is thus re-established and the torque transmitted remains unchanged. Likewise, a decrease in the coefficient of friction tends to allow the spring 50 to drive the member 20 so as to unload the spring and increase the frictional force to re-establish equilibrium.

To adjust the torque transmitted through the device, the loading of the spring washer 35 is changed, while the device is running, by means of the adjusting assembly 36. To operate the adjusting assembly, the nut 39 is held stationary (by hand) and the screw 37 is turned (by hand) to move the plate 31 longitudinally along the shaft 12.

The transmitted torque is increased by turning the screw 37 so as to push the plate 31 against the spring washer 35. The spring washer 35 is thereby compressed adding an increment to the force pushing the disc 24 against the disc 19. The frictional force developed between the discs increases as a result of this force increment, decreasing the slippage of the disc 24 over the disc 19. The clutch member 20 rotates with respect to the output shaft 12 to increase the load on the spring while the rollers 27 (in effect) move down the cam surfaces to relieve a portion of the force increment produced by the adjustment. The clutch member 20 thus assumes a new position relative to the output shaft 12 in which an increased load on the spring 50 balances an increased frictional force. The increased friction between the discs 19 and 24 causes an increased torque to be transmitted through the device to the output shaft 12.

To decrease the transmitted torque, the screw 37 is turned (while holding the nut 39 stationary) to relieve the force on the spring washer 35. The frictional force between the discs 19 and 24 thus decreases and the slip between the discs increases. The spring 50 then unwinds and drives the clutch member 20 to decrease the load on the spring and bring the rollers 27 to a higher point on the cam 25 to add back to the spring washer 35, part of the load which was relieved by the adjustment. The clutch member 20 assumes a new position relative to the shaft 12 in which the decreased load on the spring balances the decreased frictional force and the torque transmitted through the device is decreased.

It will be seen that the present invention provides a simple, economical, and reliable constant torque device which is simply and rapidly adjusted while it is in operation.

I claim:

1. A device for transmitting a constant torque comprising a shaft, first and second clutch members rotatably mounted on said shaft, friction surfaces on said clutch members for interengagement to transmit a torque between said members which varies with the force normal to said surfaces pressing the surfaces together, resilient means for urging said second clutch member against said first clutch member, a torque altering member mounted to rotate with said shaft and to be movable axially with respect to said shaft to change the loading upon said resilient means, a torsion spring connected between said second clutch member and said altering member to transmit torque to said shaft, said second clutch member assuming a rotational position with respect to said shaft such that the loading on said torsion spring equals the frictional force between said surfaces, friction compensating means responsive to the relative position of said second clutch member with respect to said shaft for changing the loading on said resilient means to compensate for changes in the friction between said surfaces and maintain the transmitted torque constant, and adjusting means for moving said altering means axially with respect to said shaft for changing the torque transmitted by the device, said adjusting means including a screw member and a nut member threaded to said screw member, one of said adjusting members being locked against axial movement with respect to said shaft and the other of said adjusting members being locked against axial movement with respect to said torque altering member, both of said adjusting members being mounted for free rotation.

2. A device according to claim 1 wherein both said adjusting members are annular and surround said shaft.

3. A device according to claim 2, wherein said screw member is mounted on said shaft and said nut member is mounted on said altering member.

4. A device according to claim 1, wherein said friction compensating means includes cam means having a first element mounted for rotation with said second clutch member and a second element mounted to rotate with said shaft, one of said elements being mounted to be moveable axially with respect to said shaft.

5. A device according to claim 4, wherein said first element is locked to said second clutch member and said second element is mounted on said shaft to be moveable axially therewith.

6. A device according to claim 5 wherein said altering member is keyed to said shaft.

7. A device according to claim 6, wherein said resilient means is positioned between said altering member and said second element.

* * * * *